United States Patent

Bryant

[15] 3,637,450
[45] Jan. 25, 1972

[54] MECHANISM FOR EFFECTING MOVEMENT OF A TIRE BUILDING DRUM DECK

[72] Inventor: Emerson C. Bryant, South Bend, Ind.
[73] Assignee: National-Standard Company, Niles, Mich.
[22] Filed: Jan. 20, 1970
[21] Appl. No.: 4,285

[52] U.S. Cl. ............................................. 156/415, 156/417
[51] Int. Cl. .................................... B29h 17/16, B29h 17/26
[58] Field of Search .......................... 18/2 TE, 45 R; 108/145;
144/288 A; 156/394, 398, 400, 401, 403, 414, 415,
416, 417, 418, 419, 420; 254/50.1, 50.2, 50.3, 50.4

[56] References Cited

UNITED STATES PATENTS 3,414,446  12/1968  Pearce et al. ..................... 156/403 X
3,485,692  12/1969  Frazier ................................. 156/416

FOREIGN PATENTS OR APPLICATIONS 1,480,193  4/1967  France ................................. 156/415

Primary Examiner—Samuel Feinberg
Assistant Examiner—Stephen C. Bentley
Attorney—Johnson, Dienner, Emrich, Verbeck & Wagner

[57] ABSTRACT

A platform moving mechanism for effecting movement of platform means, such as the deck segments of a tire-building machine having an annular expandable drum defined by a plurality of circumferentially arranged deck segments each having a plurality of supporting members extending circumferentially of the drum in spaced apart side-by-side relation, and which are in end to end interleaved relation between adjacent deck segments, and in which the deck segments are movable radially to effect relative circumferential movement of the supporting members to define substantially cylindrical supporting surfaces of different radii, in which the platform moving mechanism is formed by opposed pusher arms lying in planes extending axially of the drum pivoted at their inner ends to the deck segments and pivoted at their outer ends to pusher rings movable axially toward and away from each other, and in which the inner ends of the pusher arms are provided with meshing gear teeth so that as the pusher rings are moved axially toward and away from each other, the deck segments are moved conjointly radially inwardly and outwardly to provide for the desired radial positioning of the deck segments and consequently the circumferential positioning of the supporting members so that the outer surfaces of the latter define substantially concentric supporting surfaces at any position of the pusher rings with respect to each other.

2 Claims, 5 Drawing Figures

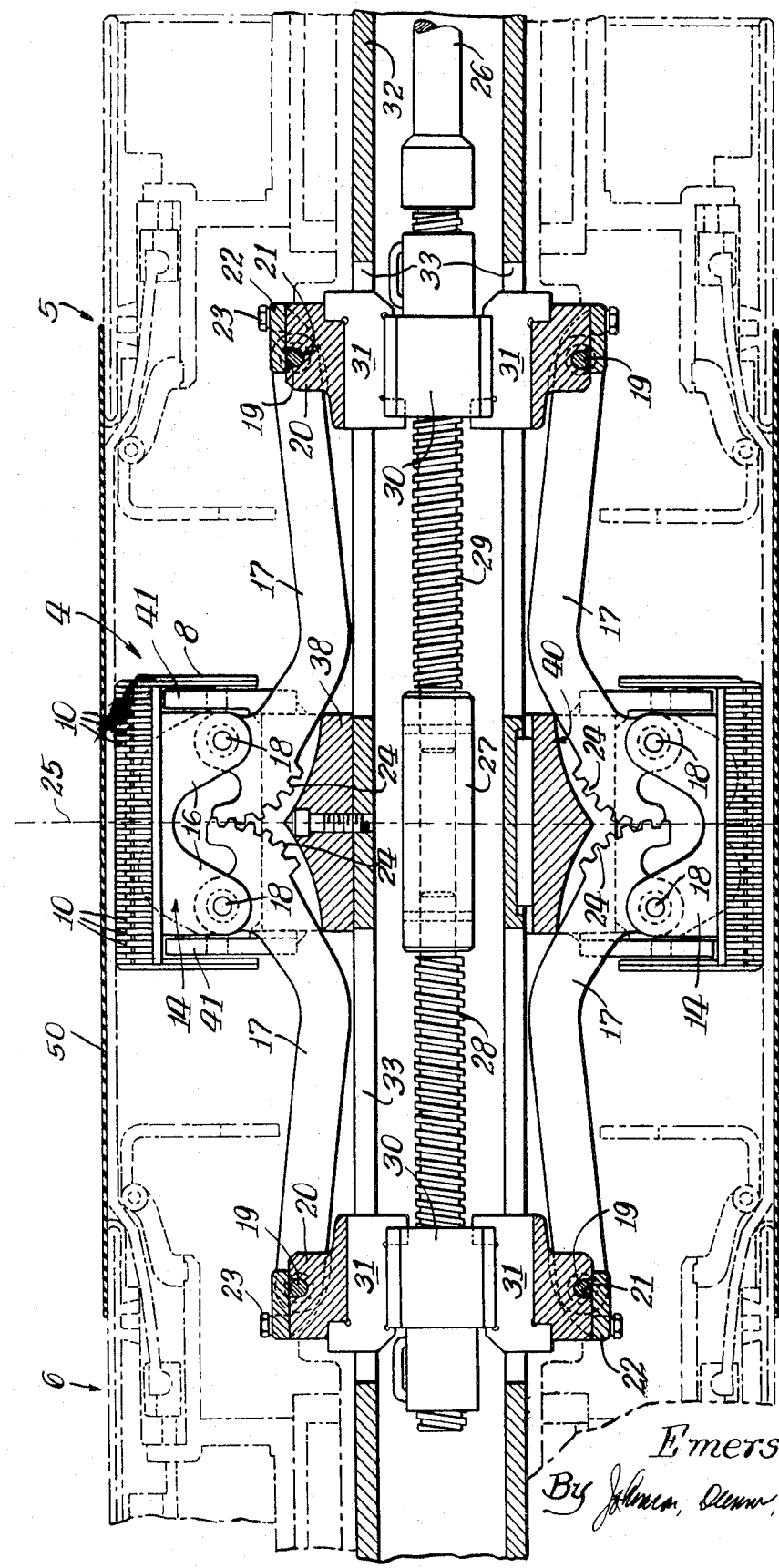

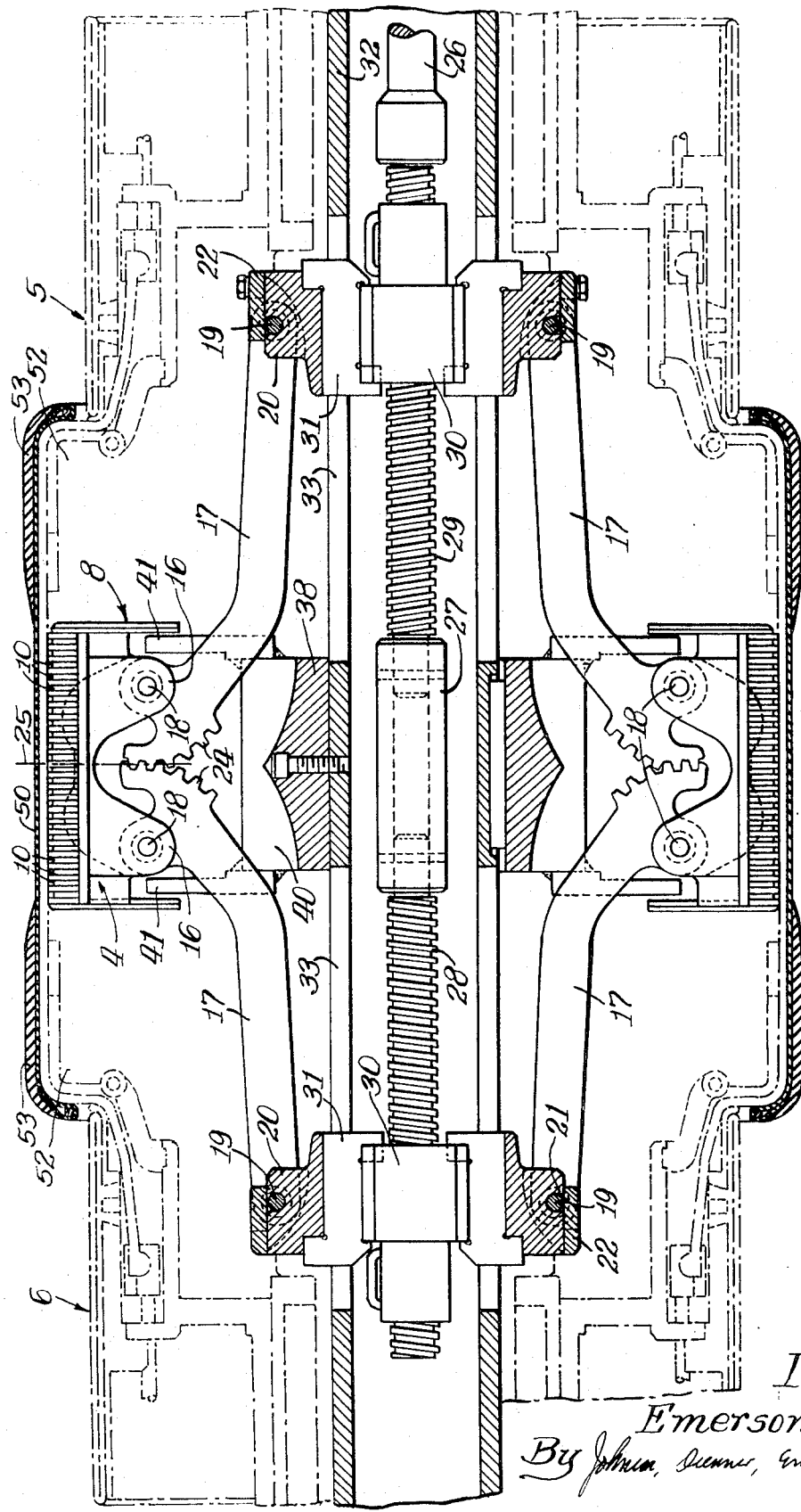

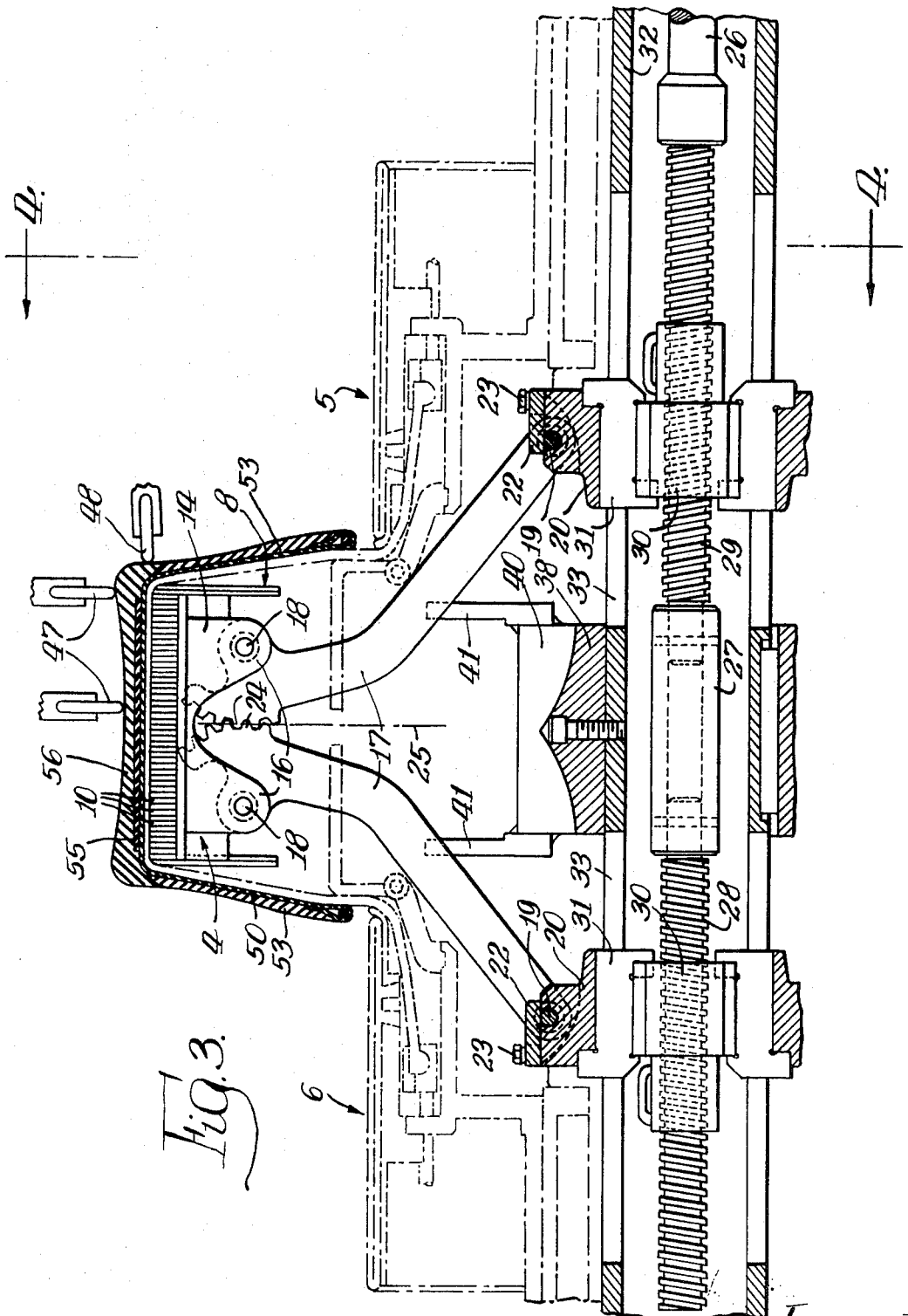

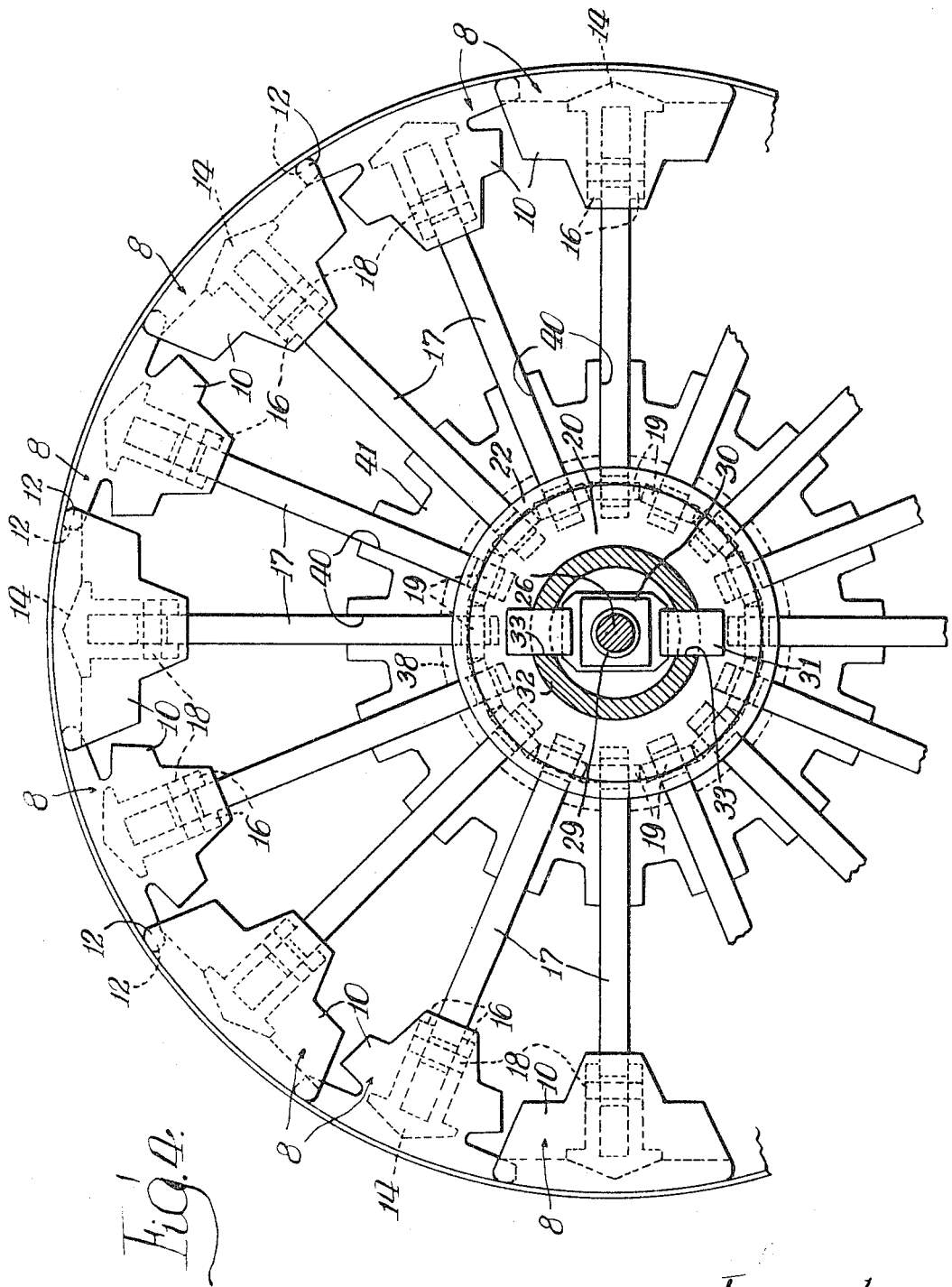

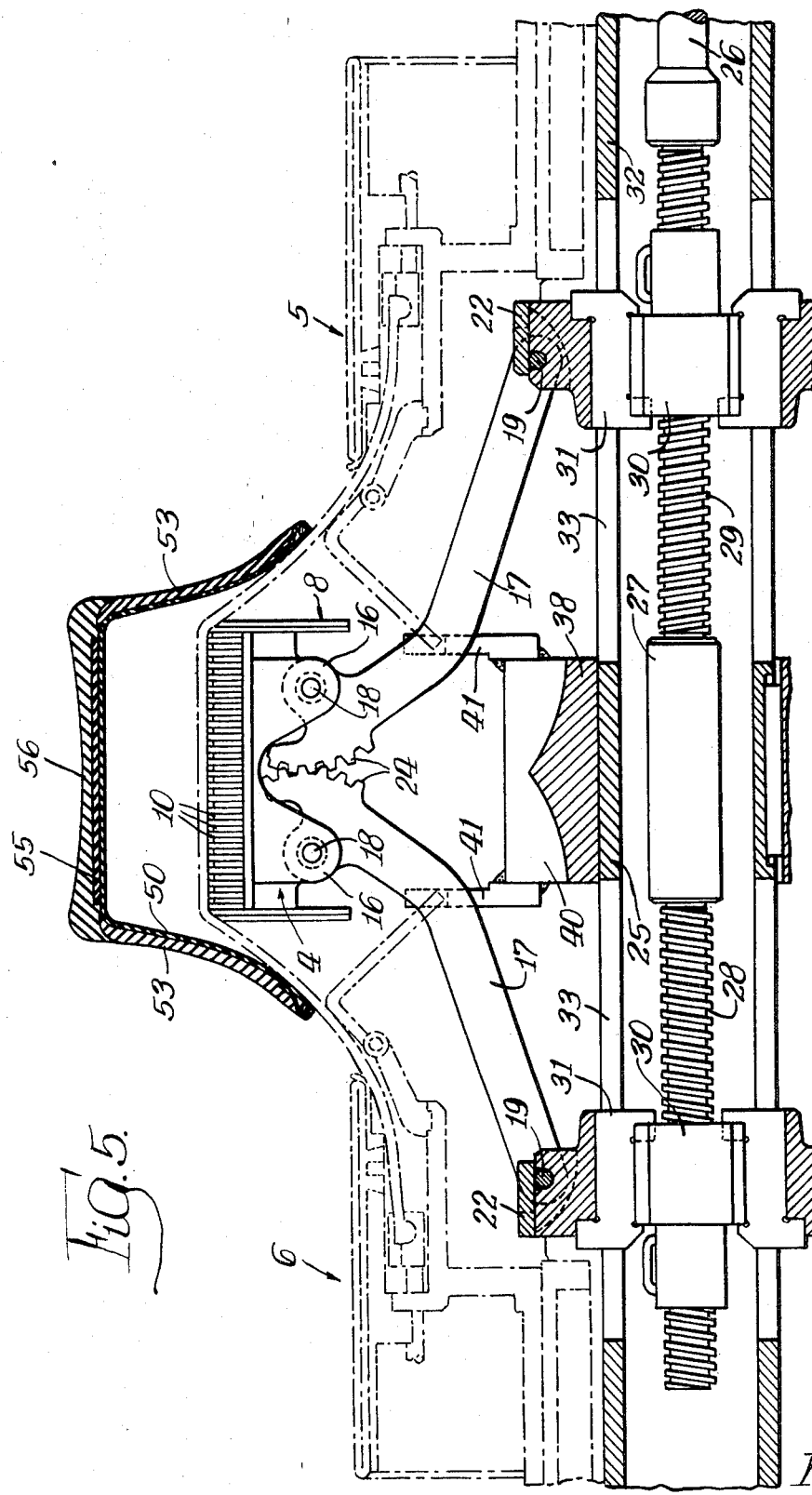

MECHANISM FOR EFFECTING MOVEMENT OF A TIRE BUILDING DRUM DECK

BACKGROUND OF THE INVENTION

It is known to my invention to provide tire-building apparatus comprising an intermediate drum and end drum assemblies which in starting or initial positions thereof for building a tire define a substantially cylindrical surface for supporting tire carcass material thereon. The intermediate drum is of a construction embodying a plurality of circumferentially arranged platforms on deck segments each of which include a plurality of supporting members or blades extending in a direction circumferentially of the drum, and which are in end to end interleaved relation between adjacent deck segments so that upon the outward radial displacement of the deck segments the outer surfaces of the supporting members or blades define substantially cylindrical supporting surfaces of different diameters. Thus, after laying of tire carcass material around the intermediate drum and end drums in their initial positions, the intermediate drum may be expanded to form bead shoulders at the ends thereof adjacent the end drums. The tire beads may be applied to the shoulders and the carcass material on the end drums turned up or layed over the beads to encase the latter. Thereafter, the intermediate drum may be further radially expanded to form the tire carcass material into substantially torous configuration approximating that of a completed tire for the application, for example, of breaker and tread components to the periphery of the tire carcass. The supporting members or blades of the deck segments in the position last noted provide a firm surface supporting the tire carcass material enabling components such as, breakers and tread components, to be well stitched to the tire carcass.

The known tire-building machines of the character above discussed have embodied intermediate drum assemblies utilizing complex arrangements for guiding and/or driving the deck segments radially inwardly and outwardly to provide the intermediate assembly with the desired substantially cylindrical surfaces of different diameters in building a tire.

THE INVENTION

The invention essentially comprehends platform moving mechanism for moving platform means with respect to an axis lying inwardly of the platform means embodying a pair of axially opposed pusher arms lying inwardly of the platform means and pivotally connected at their inner ends to the platform means, and including pusher means mounted for relative movement toward and away from each other and in which the outer ends of the pusher arms are pivotally mounted. The pusher arms at their inner ends have meshing gear teeth so that said pusher arms upon relative movement of the same toward and away from each other effect movement of the platform means with respect to the axis lying inwardly of the platform means. The invention further comprehends the provision of means for moving the pusher means conjointly toward and away from each other and at the same rate and on an axis parallel with the first referred to axis to move the platform means radially inwardly and outwardly on an axis perpendicular of the axis of movement of the pusher rings and equidistant between the latter.

A specific feature of the invention resides in the provision of guide block means for preventing substantial movement of the pusher arms circumferentially relative to the axis of the pusher arms.

The invention in one specific utilization thereof concerns the foregoing mechanism for moving a plurality of deck segments of a tire-building drum, as aforenoted, radially inwardly and outwardly so that the supporting members thereof define substantially cylindrical supporting surfaces of different desired diameters. The platform moving mechanism of the invention as incorporated in the aforementioned tire-building drum includes a pair of opposed pusher arms for each of the deck segments of the drum lying in planes extending axially of the drum which are pivotally connected at their inner ends to the deck segments and at their outer ends to pusher rings which are movable axially toward and away from each other. The opposed pusher arms at their inner ends form, as aforenoted, with meshing gear teeth so that as the pusher rings are moved conjointly toward and away from each other at the same rate the deck segments are accurately and conjointly moved radially inwardly and outwardly. The application of the mechanism to the aforementioned tire-building drum effects relative circumferential movement of the supporting members or blades of the deck segments to define accurate concentric supporting surfaces for the tire carcass material.

DESCRIPTION OF THE DRAWINGS

FIG. 1 is a longitudinal sectional view of a tire-building apparatus embodying the platform moving mechanism of the present invention with the parts in position for supporting tire carcass material in the form of a tube;

FIG. 2 is a view similar to FIG. 1 but showing the parts in position for forming tire bead shoulders in the tire carcass material;

FIG. 3 is a view similar to FIG. 2 but showing the parts in position at which the tire carcass material is formed into substantially torous configuration approximating that of a completed tire, and at which a breaker and tread cap are being applied to the tire carcass material;

FIG. 4 is a view taken substantially along the line 4—4 on FIG. 3 looking in the direction indicated by the arrows; and FIG. 5 is a view similar to FIG. 3 but showing the position of the parts in collapsing the drum to remove a completed assembly of components of a tire.

DESCRIPTION OF A PREFERRED EMBODIMENT OF THE INVENTION

Referring now to FIG. 1 the tire-building apparatus there shown comprises an intermediate drum assembly 4 and end drum assemblies 5 and 6, the latter being shown in dot-dash outline in that the platform moving mechanism of the present invention is incorporated for expanding the drum of the intermediate drum assembly 4.

The intermediate drum assembly 4 is best seen in FIGS. 1 and 4 comprising a plurality of circumferentially arranged platforms or deck segments 8. Each deck segment may typically include a plurality of supporting members or blades 10 extending circumferentially of the drum 4 in spaced apart side by side relation and which are in end to end interleaved relation between adjacent drum sections 8. In the fully expanded position of the drum as shown in FIG. 4, the adjacent end portions 12 of adjacent blades preferably remain interleaved. Each deck segment 8 is formed with a bifurcated bracket 14 having radially inwardly extending opposed arm portions 16 between which the inner ends of a pair of pusher arms 17 are pivotally mounted as at 18. The pusher arms 17 lie in planes extending axially of the drum and at their outer ends are pivotally mounted as at 19 in axially spaced apart pusher means such as pusher rings 20.

As shown the pusher rings 20 are formed with transversely extending substantially annular sockets 21 receiving the pivot pins 19 and which pivot pins are retained in the sockets by retaining member 22 secured to the pusher ring 20 by bolt 23. The pusher arms 17 adjacent their inner ends are provided with identical meshing teeth 24 at the transverse center line 25 of the drum 4 perpendicular to the axis of the pusher rings 20.

In order to provide for the axial inward and outward movement of the pusher rings 20 with respect to each other, there is provided a hollow outer shaft 32 within which inner shaft means 26 is arranged. The inner shaft means 26 is formed with left- and right-hand threaded shaft sections 28 and 29, respectively, joined by a collar 27 at their opposed inner ends for keying the two shafts together for conjoint rotation. Ball nuts 30 have threaded engagement with the threaded portion of each of the shafts 28 and 29, each of which carry ball nut adapters 31 which extend through axially extending slots 33 disposed in diametrically opposed relation in the hollow shaft member 32, with one such slot being provided for each of the nut adapters 31. The ball nut adapters 31 have the above-described pusher rings 20 secured thereto. Mounted centrally of the hollow shaft 32 is a guide block means comprising a hub 38 and end flange member 41 at opposite ends of the hub 38 of the guide block means. The guide block means 38 is provided with slots 40 which serve to guide but prevent circumferential movement of the adjacent outer portions of the pusher arms 17 in operation of the apparatus.

As before indicated, FIG. 1 shows the position of parts in initial or starting position for the construction of a tire carcass. In this position of the parts, the inner screw means 26 has been suitably rotated by means not shown to dispose the pusher ring 20 to their axially outermost position with respect to each other, and in which positions the intermediate assembly 4 together with the end drum members 5 and 6 define a substantially cylindrical surface for supporting tire carcass material as indicated at 50 in the form of a cylindrical tube. After placement of the tire carcass material as noted in connection with FIG. 1, the inner shaft means 26 is rotated to effect conjoint axial inward movement of the pusher rings 20 toward each other and at the same rate and which through the meshing engagement of the gear teeth 24 radially expand the intermediate drum 4 to the position shown in FIG. 2 at which the supporting members or blades have moved circumferentially relative to each other to provide a cylindrical supporting surface of larger diameter than that shown in FIG. 1, and providing or defining bead shoulders, as indicated at 52, for the application of tire beads to the tire carcass material. Also, if desired tire sidewall components 53 may be applied to the end drum assemblies 5 and 6 as shown in FIG. 2. After forming of the ply turnups for the beads in the position of the parts as shown in FIG. 2, the inner shaft means 26 is further rotated to effect the further inward axial conjoint movement of the pusher rings 20 toward each other, and which through the meshing gear teeth 24 provide for disposal of the intermediate drum assembly to the position shown in FIG. 3. In this position of the parts, the tire carcass material has been formed into substantially torous configuration approximating that of a completed tire. It will be noted that in movement of the parts from the position shown in FIG. 1 to the position shown in FIG. 2 that the inner end portions of the pusher arm 17 are guided in the slots 40 of the guide block 38 and the slots in the end guide members 41, and in the advancement of the parts from the position shown in FIG. 2 to the position shown in FIG. 3 the slots in the end guide members 41 continue to guide the pusher arms 17.

It will be observed that the slots 40 in the guide block means 38, and the end members 41 prevent substantial circumferential movement of the guide arm 17 and add rigidity to the drum construction in a circumferential direction. The meshing of the gear teeth 24 in the position of the parts as shown in FIG. 3 rigidly and accurately dispose the deck segments 8 with respect to each other so that the supporting members 10 define an accurate cylindrical supporting surface for the tire carcass material to enable the application of a breaker 55 and a tread cap 56 as shown in FIG. 3 by stitching wheels 47. Also, as shown stitching wheel 48 is stitching the tread wing over the shoulder of the tire carcass. It will thus be seen that the above construction provides a rigid construction for taking both radial and axial thrusts in stitching components of a tire to a tire carcass.

It should be noted that the gear teeth 24 are constantly in mesh and as the deck segments are forced radially outwardly on the axis 25 perpendicular to the axis of the pusher means 20 and equidistant therebetween causing the deck segments to remain substantially level or parallel to the axis of the drum 4. The gear teeth 24 as noted also maintain the deck segments in a level position resisting unequal roller pressures and also side pressures such as are present in the application of the breaker and tread cap or sidewall components.

Also, as aforenoted, the guide slots 40 in the guide block means 38 and arms 41 serve as torsion driving members for the pusher arms 17 and through them for the deck segments if it is desired to effect rotation of the intermediate assembly as, for example, in the stitching of the breaker or tread cap to the tire carcass.

In connection with FIG. 5 it will be observed that the parts are shown in a partially collapsed position after completion of the assembly of components for a tire with the geometry being such that the intermediate section 4 collapses out of the assembled components of the tire carcass material to enable removal of the completed assembly of tire components from the drum assembly upon completion of retraction of the parts to the position shown in FIG. 1.

The invention claimed is:

1. For use with a tire building drum having a plurality of circumferentially arranged deck segments each having a plurality of supporting members extending circumferentially of the drum in spaced apart side-by-side relation, and in which the supporting members of adjacent deck segments are in interleaved relation with respect to each other, the combination therewith of a pair of opposed pusher arms for each of said deck segments lying in planes extending axially of the drum, means pivotally mounting the inner ends of said pusher arms to said deck segments, pusher rings mounted for movement toward and away from each other axially of the drum, means pivotally connecting the outer ends of said pusher arms to said pusher ring, said pusher arms at their inner ends having meshing gear teeth, moving means for moving said pusher rings toward and away from each other and which through said pusher arms of said meshing gear teeth effect radial movement of said deck segments and relative circumferential movement of said supporting members with respect to each other, and guide block means for serving as torsion driving members for said pusher arms and said deck segments.

2. For use with a tire building drum having a plurality of circumferentially arranged deck segments each having a plurality of supporting members extending circumferentially of the drum in spaced apart side-by-side relation, and in which the supporting members of adjacent deck segments are in interleaved relation with respect to each other, the combination therewith of a pair of opposed pusher arms for each of said deck segments lying in planes extending axially of the drum, means pivotally mounting the inner ends of said pusher arms to said deck segments, said inner ends of said pusher arms having meshing gear teeth, a hollow outer shaft extending axially of said drum, pusher rings lying outwardly of said hollow shaft, means connecting the outer ends of said pusher arms to said pusher rings, means for mounting said pusher rings for conjoint movement toward and away from each other axially of the drum comprising an inner shaft extending coaxially of and within said outer shaft having oppositely threaded end portions, ball nut means for said oppositely threaded end portions of said inner shaft, connecting means extending through slots in said hollow shaft connecting said ball nut means with said pusher rings whereby upon rotation of said inner shaft in one direction said pusher rings are moved axially toward each other, and upon rotation of said inner shaft in the opposite direction said pusher rings are moved axially away from each other, and guide block means mounted centrally of said hollow shaft for serving as torsion driving members for said pusher arms and said deck segments.

* * * * *